United States Patent
Lajoie-Mazenc et al.

(10) Patent No.: US 11,520,873 B2
(45) Date of Patent: Dec. 6, 2022

(54) ENROLLMENT OF A DEVICE IN A SECURE NETWORK

(71) Applicant: ELECTRICITE DE FRANCE, Paris (FR)

(72) Inventors: Paul Lajoie-Mazenc, Massy (FR); Alexandre Michon, Massy (FR); Gautier Delis, Bourg la Reine (FR); Florent Cardolaccia, Nanterre (FR)

(73) Assignee: ELECTRICITE DE FRANCE, Paris (FR)

( * ) Notice: Subject to any disclaimer, the term of this patent is extended or adjusted under 35 U.S.C. 154(b) by 235 days.

(21) Appl. No.: 16/645,236

(22) PCT Filed: Jul. 19, 2018

(86) PCT No.: PCT/EP2018/069692
§ 371 (c)(1),
(2) Date: Mar. 6, 2020

(87) PCT Pub. No.: WO2019/048119
PCT Pub. Date: Mar. 14, 2019

(65) Prior Publication Data
US 2020/0285732 A1 Sep. 10, 2020

(30) Foreign Application Priority Data
Sep. 7, 2017 (FR) ...................................... 17 58271

(51) Int. Cl.
*H04L 29/06* (2006.01)
*H04L 9/32* (2006.01)
(Continued)

(52) U.S. Cl.
CPC ............ *G06F 21/44* (2013.01); *H04L 9/3234* (2013.01); *H04L 63/061* (2013.01); *H04L 63/083* (2013.01); *H04L 2463/082* (2013.01)

(58) Field of Classification Search
CPC ....... G06F 21/44; G06F 21/30; H04L 9/3234; H04L 63/061; H04L 63/083; H04L 2463/082
See application file for complete search history.

(56) References Cited

U.S. PATENT DOCUMENTS

| 8,578,467 B2 * | 11/2013 | Ronda | ................ H04L 63/0853 |
| | | | 713/172 |
| 2007/0022469 A1 * | 1/2007 | Cooper | ................ H04L 9/3263 |
| | | | 726/3 |

(Continued)

FOREIGN PATENT DOCUMENTS

WO      2016/020950 A1      2/2016

OTHER PUBLICATIONS

Content Protection Based on Trusted Computing in Mobile Terminal, Ren et al, Dec. 2009 (Year: 2009).*

*Primary Examiner* — Jahangir Kabir
(74) *Attorney, Agent, or Firm* — Faegre Drinker Biddle & Reath LLP

(57) ABSTRACT

A method for enrolling a device in a secure network to which an information system is connected, the method comprising the steps, implemented by a trusted device connected to the secure network, of: a) receiving from a user terminal, distinct from the device to be enrolled, an authorization to connect to the device to be enrolled, b) generating cryptographic keys intended for the device to be enrolled to access the secure network, and c) transmitting the cryptographic keys to the device to be enrolled.

11 Claims, 3 Drawing Sheets

(51) Int. Cl.
*G06F 21/44* (2013.01)
*H04L 9/40* (2022.01)

(56) References Cited

U.S. PATENT DOCUMENTS

| | | |
|---|---|---|
| 2014/0181521 A1 | 6/2014 | Hemphill et al. |
| 2016/0006566 A1* | 1/2016 | Morgner ............... H04L 9/0866 713/185 |
| 2016/0226837 A1* | 8/2016 | Kim ...................... H04W 12/06 |
| 2016/0270020 A1 | 9/2016 | Adrangi et al. |

* cited by examiner

ENROLLMENT OF A DEVICE IN A SECURE NETWORK

CROSS-REFERENCE TO RELATED APPLICATIONS

This application is the U.S. national phase of the International Patent Application No. PCT/EP2018/069692 filed Jul. 19, 2018, which claims the benefit of French Patent Application No. 17 58271 filed Sep. 7, 2017, the entire content of which is incorporated herein by reference.

FIELD

The disclosure relates to the security of exchanges between computer entities, and more particularly to the enrollment of an IED ("Intelligent Electronic Device") type of device in a secure network connected to an information system ("IS") typically of a company.

BACKGROUND

Such an IED device may be a computer device intervening for example in a transformer substation of the carrier, of a distributor, or of a customer (consumer or producer). More generally, it can be any type of device such as a "smart" meter, or a user terminal (TU), a smartphone-type of business telephone for industrial or tertiary use, or other. More particularly, here an IED device refers to an industrial device to which a limited trust level is granted. Typically, this type of device does not have the intrinsic capabilities necessary for enrollment with the high level of security required by certain fields of business.

Such devices require cryptographic components needed to connect to the secure network of an information system of a company, for example such as a company operating said electricity distribution network. More generally, the term "Company" is used below to designate any user entity for which a new IED device is intended and is to be enrolled in order to be able to communicate via its secure network.

One can then plan to designate a secure network entity, such as a router or more particularly a secure gateway of the network, to manage the exchanges necessary for the IED to obtain the cryptographic components enabling it to connect to the secure network.

More generally, in order to communicate securely (authenticity, integrity, confidentiality) with the centralized information system IS, the IEDs can go through such a local device (said secure gateway) dedicated to securing this critical link. This device is a highly secure access control device designated by the acronym "HSACD" and can therefore be a network device enabling perimeter protection (firewall, encrypted tunnel) near a component of an industrial IS, or the secure interconnection between different components of the industrial IS. In addition to these perimeter security mechanisms, the HSACD can offer "proximity" security services to the business systems they protect, such as the centralization and correlation of log files or cryptographic services.

However, to do this, communications between the IEDs and the HSACD must also be secure, possibly with a lower level of security. The IEDs themselves must therefore have cryptographic components (keys, certificates) to secure this communication with the HSACD.

However, there is a first problem relating to the fact that, when the IEDs leave the factory of a supplier, they are generally not considered by the Company to have a high trust level (in particular under the assumption that the IEDs may include cryptographic components from another trust domain, such as that of the supplier). These IEDs therefore cannot communicate with any devices of the Company. It is then necessary to "enroll" the IEDs before they can communicate with the Company network, enrolling them either with the IS or even with the HSACD. In particular, it is advisable prior to any communication to deliver cryptographic components to the IED in a controlled process allowing the devices to be inserted into the trust domain of the Company, and otherwise to limit as much as possible the "penetration" of an unenrolled IED into the Company's trust domain.

Another problem is that the IEDs may not have the computing resources needed to generate robust keys.

The disclosed embodiments improve this situation.

SUMMARY

To this end, it proposes a method for enrolling a device in a secure network to which an information system is connected, the method comprising the steps, implemented by a trusted device connected to the secure network, of:

a) receiving from a user terminal, distinct from the device to be enrolled, an authorization to connect to the device to be enrolled, b) generating cryptographic keys intended for the device to be enrolled to access the secure network, and c) transmitting the cryptographic keys to the device to be enrolled.

In one embodiment, the method comprises a step wherein, prior to transmission of the cryptographic keys and after generation of the cryptographic keys, a certification of the keys is requested from the information system.

Upon obtaining this certification, the cryptographic keys and an associated certificate are sent to the device to be enrolled.

In one embodiment, the request for certification of the keys is carried out according to at least one among the CMP, SCEP, CMS protocols.

In one embodiment, the connection authorization issued in step a) is conditional on the user of the terminal supplying a valid identifier.

For example, in one embodiment, the identifier is a personal identification code, entered by the user on a human-machine interface of the terminal.

In one embodiment, an invitation to enter the identification code is triggered on the terminal by collaboration of the terminal with a cryptographic token available to the user.

In one embodiment, the cryptographic token is a USB key with a processor, comprising a male connection member arranged to interconnect with a counterpart female connection member comprised in the user terminal, the interconnection of the members causing execution of a routine on the user terminal asking the user to enter his or her personal identification code.

In one embodiment, the trusted device is a highly secure access control device of the network.

The present disclosure relates to a computer program comprising instructions for implementing the method when the program is executed by a processor.

The present disclosure also relates to a trusted device comprising a processing circuit for implementing the method.

The present disclosure further relates to a user terminal comprising a processing circuit for implementing the method.

Lastly, the present disclosure relates to a cryptographic token comprising a processing circuit for implementing the method.

BRIEF DESCRIPTION OF THE DRAWINGS

Other features and advantages will be apparent from reading the exemplary embodiments presented in the detailed description below, and from examining the appended drawings in which.

DETAILED DESCRIPTION

Thus, the method of the disclosure proposes applying a protocol enabling the integration of an IED into the trust domain of the Company by relying on the secure device HSACD.

Advantageously, this solution allows:
having the keys subsequently used by the IED to be generated by the HSACD, when the IED is unable to do so,
physically checking the integrity of the IED and the link between the HSACD and the IED before enrollment, which increases the trust level in the link between the HSACD and the IED.

Figure 1:
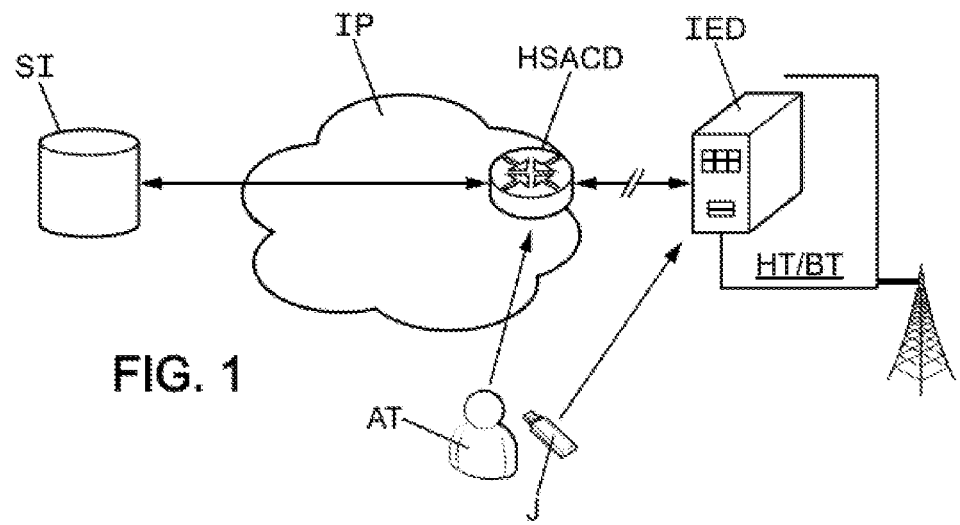
FIG. 1 schematically illustrates a system, in an exemplary embodiment.

In the embodiment presented below, this solution proposes implementing a system with four entities, as illustrated in FIG. 1:
the IED itself, which initially is not in the trust domain of the Company and therefore cannot communicate with the HSACD or the IS of the Company;
the HSACD, a device present in the trust domain of the Company, connected to the IED by an IP network;
a field agent AT, who configures the HSACD and the IED and who ensures their proper "business-related" operation;
a cryptographic token J of the agent, which allows the agent to prove that he or she is part of the trust domain of the Enterprise DE, this cryptographic token J working for example by the entry of a simple PIN ("personal identification number") known only to the agent AT.

Figure 2:
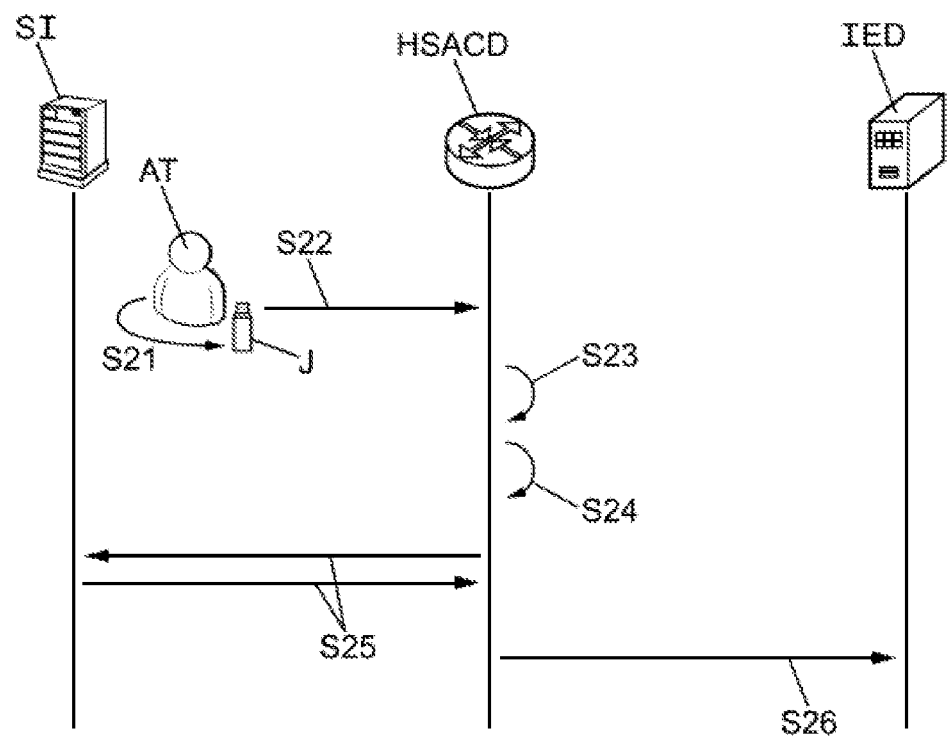
FIG. 2 illustrates the exchanges between the different entities of this system, in an exemplary embodiment.

With reference to FIG. 2, in one exemplary embodiment the protocol may proceed as follows.

In step S21, the agent AT verifies the physical compliance of the HSACD-IED connection and of the IED itself.

In step S22, the agent AT connects to the HSACD using his or her cryptographic token J and the associated PIN. For example, the agent AT may have at access to a user terminal (TU) such as a computer, connected (typically via the IP network) to the HSACD device and equipped with a female socket capable of accommodating a USB key. The cryptographic token J may then be in the form of a USB key or "dongle", equipped with a processor capable of executing a predefined routine when the token connects to the terminal TU of the agent AT. In particular, this routine consists of:

asking the agent AT to enter a PIN code via a human-machine interface of the TU,
and if the PIN code entered is correct (by comparison with a specific PIN code reference stored in the dongle's memory), connecting the TU to the IP network in order to notify the HSACD router that an authorized IED device (since the entered PIN code is valid) wants to connect to the protected network of the IS (possibly with an IP address which the agent AT may optionally provide).

Thus, at the end of this step S22 and due to the action of the cryptographic token, the HSACD agrees to go into "enrollment of an TED" mode in step S23. In the next step S24, the HSACD generates the encryption/decryption keys for the IED to access the secure network of the IS, and thus to communicate with the IS.

Prior to the communication of these keys to the TED, the HSACD has these keys certified by the IS, via a conventional protocol that is known per se, in step S25.

An example of a possible protocol for the implementation of step S25 may be CMS (for "Cryptography Message Syntax"), or CMP (for "Certificate Management Protocol"), or even SCEP (for "Simple Certificate Enrollment Protocol"), of the IEFT ("Internet Engineering Task Force"), or others.

Finally, in step S26, the HSACD transmits the keys thus certified to the IED, in other words the cryptographic keys and the associated certificate, thus allowing its secure connection to the protected network of the IS. This communication in step S26 may be carried out via a conventional interface (webservice type), possibly standardized (as defined in the IEC-61850 standard for example).

Figure 3:
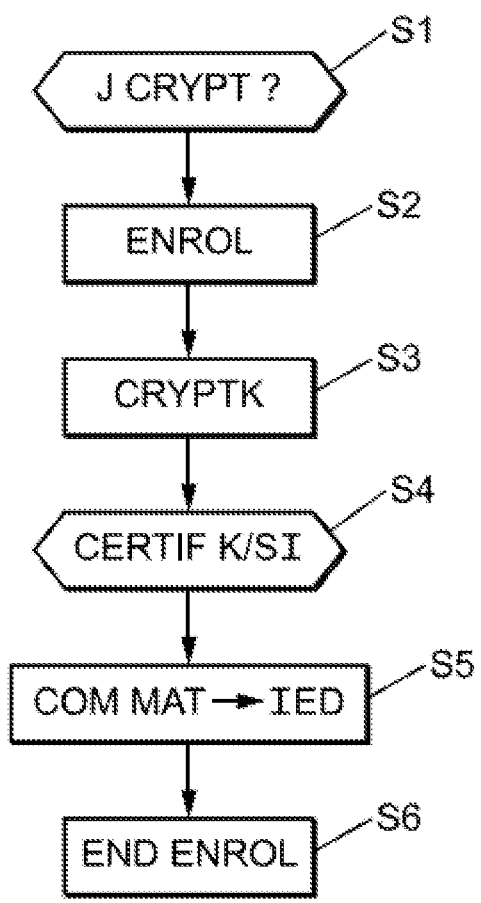
FIG. 3 illustrates the main steps implemented by a trusted device HSACD, in an exemplary embodiment, FIG. 4 schematically illustrates the structure of such a trusted device HSACD, in an exemplary embodiment, FIG. 5 schematically illustrates the structure of a cryptographic token J and that of a terminal TU available to a field agent AT and able to collaborate with the token J, in an exemplary embodiment.

The steps implemented by the highly secure access control device HSACD are summarized in FIG. 3. For example, at the end of a first step S1, if the HSACD receives a request to enroll a new device IED, communicated by the cryptographic token J, via the terminal TU of the agent AT, the HSACD executes an enrollment computer routine in step S2. This computer routine begins, in step S3, with the generation of cryptographic keys K. In step S4, these keys are certified with the information system SI. Then, in step S5, the secure gateway HSACD sends these certified keys to the IED (and more generally the cryptographic components MAT necessary for the IED to connect to the secure network). Once these have been sent to the IED, the HSACD can end the enrollment procedure in step S6.

Figure 4:
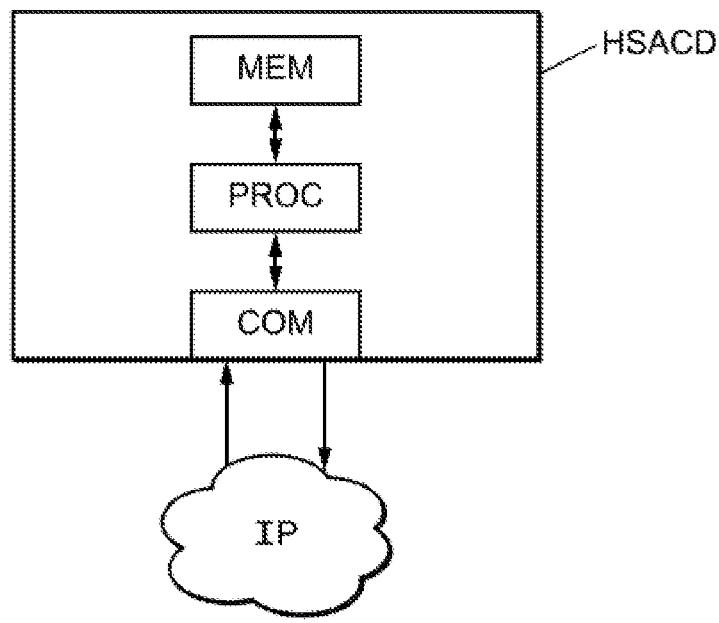

Now with reference to FIG. 4, the HSACD device comprises for example a communication interface COM for communicating via the IP network, connected to a processor PROC for executing all or part of the instructions of the computer program according to an embodiment, these instructions being for example stored in a memory MEM with which the processor PROC can collaborate. These instructions typically make it possible to execute the enrollment protocol described above with reference to FIG. 3.

Figure 5:
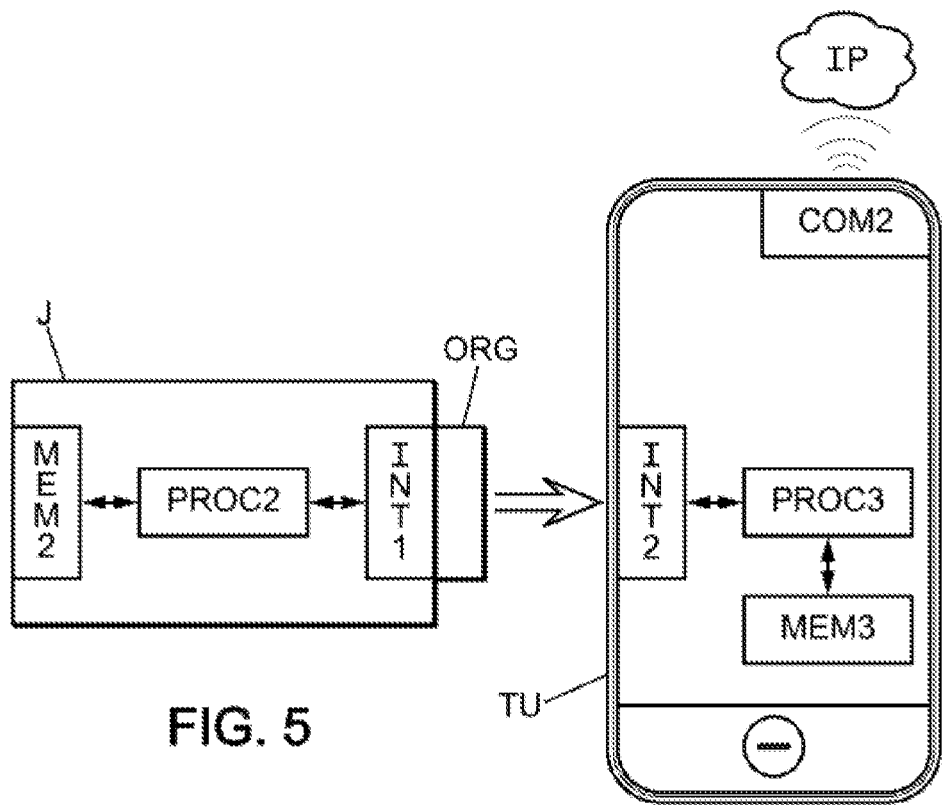

With reference to FIG. 5, the cryptographic token J may be in the form of a USB dongle, comprising an interface INT1 connected to a male connection member ORG and to a processor PROC2, this processor being capable of executing part of the instructions of the computer program according to an embodiment. This part of the instructions may be stored for example in a memory MEM2 with which processor PROC2 can collaborate. These are typically instructions launching the human-machine interface on the user terminal TU in order to enter the user's PIN code, verify this code against the reference stored in the memory MEM2 of the token J, and send to the login terminal TU the command to connect to the HSACD in order to execute the IED enrollment procedure.

The user's terminal TU (here, a terminal available to a field agent AT) itself may comprise an interface INT2 connected to:
- a female connection member arranged to receive the member ORG of the cryptographic token J, and
- a processor PROC3 comprised in the terminal TU, and capable of executing part of the instructions of the computer program according to an embodiment.

This part of the instructions may be stored for example in a memory MEM3 with which processor PROC3 can collaborate. These are typically instructions allowing the terminal TU to collaborate with the token J for the launching of the human-machine interface and the entry of the PIN code, then to connect to the HSACD in order to execute the IED enrollment procedure.

One will note, however, that in a possible alternative to the one illustrated in FIG. 5, the terminal TU may store in memory MEM3 a computer security module in the form of an application for example which, when executed, requests via a human-machine interface the entry of a PIN code, and if the code is valid, contacts the HSACD to initiate the IED enrollment protocol. In addition, as an alternative to entering a PIN code, it may be provided to enter a biometric print (fingerprint or iris) of the user, which is compared to a reference previously stored on the user terminal TU. Of course, yet other embodiments may alternatively also be provided. For example, the token J may be in the form of a near-field contactless chip card which can be read by the terminal TU.

The disclosed embodiments offer numerous advantages over immediate solutions for the enrollment of an IED, for example by using the known protocols CMP, SCEP, or CMS, used in the field of tertiary sector computing. For the initial establishment of trust, these protocols can use several mechanisms:
- a certificate already established in the IED; or
- unique identifier and password for the IED, allowing it to authenticate itself with the IS.

In the case of the pre-established certificate, the IED is already considered to be enrolled in the target trust domain, which assumes:
- that the supplier of the IED has elements enabling dialog with the target trust domain, which increases the risk of attack;
- or that the IED undergoes a preparatory step between its reception and its installation in the field, which is costly.

The case of the unique identifier and password for the IED poses similar problems:
- the identifier and password are integrated at the factory by the IED supplier;
- or else the identifier and password are entered by the agent installing the IED in the field, but in this solution it is necessary to generate these passwords in a secure manner, transmit them to the agent, etc. Such management is complex and this solution is slow (the field agent finds out the password, copies it without any typing errors, etc.).

The presented solution does without these two mechanisms due to the HSACD, a highly secure device which is already able to communicate with the trust domain, and makes it possible to minimize the impact on the supplier and on the field agent performing the installation of the IED.

The invention claimed is:

1. A method for enrolling a first device in a secure network to which an information system is connected, the method comprising the steps, implemented by a trusted device connected to the secure network, of:
   a) receiving from a user terminal, distinct from the first device, an authorization to connect to the first device, said authorization notifying the trusted device that the first device is authorized to connect to the secure network, wherein the connection authorization issued in step a) is conditional on the user of the terminal supplying a hardware cryptographic token and validating the hardware cryptographic token,
   b) upon receiving the authorization to connect to the first device, generating cryptographic keys intended for the first device to access the secure network, and
   c) enrolling the first device in the secure network by transmitting the cryptographic keys to the first device, in order for the first device be able to communicate via the secure network without requiring the user terminal to further communicate with the trusted device, such cryptographic keys securing said communication of the first device with at least the trusted device.

2. The method of claim 1, comprising:
   after generation of the cryptographic keys, requesting a certification of said keys with the information system, and upon obtaining this certification, sending the cryptographic keys and an associated certificate to the first device.

3. The method of claim 2, wherein the request for certification of the keys is carried out according to at least one among the Certificate Management Protocol (CMP), the Simple Certificate Enrollment Protocol (SCEP), and the Cryptography Message Syntax (CMS) protocols.

4. The method of claim 1, wherein validating the hardware cryptographic token includes validating a personal identification code, entered by the user on a human-machine interface of the terminal.

5. The method of claim 4, wherein an invitation to enter the personal identification code is triggered on the terminal by collaboration of the terminal with the hardware cryptographic token.

6. The method of claim 5, wherein the hardware cryptographic token is a USB key with a processor, comprising a male connection member arranged to interconnect with a counterpart female connection member comprised in the user terminal, the interconnection of the members causing execution of a routine on the user terminal asking the user to enter his or her personal identification code.

7. A hardware cryptographic token comprising a processing circuit for implementing the method according to claim 5.

8. The method of claim 1, wherein the trusted device is a highly secure access control device of the network.

9. A user terminal comprising a processing circuit for implementing the method of claim 1.

10. A non-transitory computer-readable medium comprising a computer program stored thereon and including instructions for implementing the method of claim 1 when the instructions are executed by a processor.

11. A trusted device comprising a processing circuit for implementing the method of claim 1.

* * * * *